Nov. 15, 1949  C. T. TORRESEN  2,488,103

FASTENER

Filed July 4, 1944

INVENTOR.
Carel T. Torresen

Patented Nov. 15, 1949

2,488,103

UNITED STATES PATENT OFFICE 2,488,103

FASTENER

Carel T. Torresen, Santa Monica, Calif.

Application July 4, 1944, Serial No. 543,475

1 Claim. (Cl. 24—221)

This invention relates to improvements in fastening devices which may be cooperatively utilized to fasten parts together.

More particularly, the invention applies to fasteners used for the securing of detachable covers or cowling to aircraft surfaces where a certain amount of variation in the thickness of the parts must be provided for in the fastener, yet having the faculty of permitting but limited separation of the covers or cowling members from their supporting surfaces when subjected to abnormal forces, such as those created by gust conditions or high dynamic forces and the like while in flight.

A further improvement provided in the fastener is strength to resist slippage of the fastened members under imposed high side loads. A further improvement is the inclusion of a relatively easy locking means.

Fasteners have been marketed, employing a simple wire acting as a beam and having resilient coils at its ends used in cooperation with a hook end of a headed stud. A tension load on the stud introduces bending of the wire beam. To withstand stud heavy end loads, several types of reinforcements in the form of slotted cup-like members or bent plates have been introduced for use under the wire beam.

In application of these reinforcements, sufficient deflection clearance must be permitted between the fastener wire beam and the reinforcement to allow the detent portion of the stud hook end to lock.

The cup-like reinforcement usually provides only narrow support at the contact of cup wall and wire beam. Between the two points of contact with the cup, the wire beam can deflect freely.

In shear applications, that is, when tension forces in the sheets to be fastened tend to place the fastener stud in shear, side movement or slippage of the sheets will occur causing the stud to pivot about the wire beam and to cock over until clearances of the holes in the sheets at one side of the stud are consumed, after which the sheets are restrained from further movement by the stud, until failure occurs. The side movement of the sheets relative to each other therefore may be considerable.

Another type of spring reinforcement in the form of a bent plate, typified in form as a hat section, provides a line contact support to the wire beam when deflected by pressure exerted by the stud. However, as a beam support, the bent plate suporting section suffers the handicap of possessing the least moment of inertia in the direction of tension load on the stud.

In this type fastener, the slippage of the sheets is slightly less than that for the fastener employing the cup-like reinforcement, due to alignment holes in the plate support and to the position below the fastener spring limiting the cocking propensity of the stud, when acted upon by the movement of sheets.

Other types of fasteners utilized for the joining of sheet members have been manufactured. Some of these employ shear pins mounted in the stud to withstand tension loads in the stud. Usually the locking means consists of spring plates which not only carry loads imposed upon them by the stud pins, but have recesses in the plates also, to act as a detent for the stud shear pin.

Still other fasteners employ a second spring plate in addition to the load carrying plate to act merely as a lock on the non-load side of the shear pin.

In all of these types of fasteners, the multiplicity of parts coupled with difficulty of assembly, bulk and the maintenance of a balanced supply militate against their broadened use.

The improvements incorporated in my invention provide a simple fastener of a minimum number of parts, capable of being designed for high strength and providing for limited deflection of the fastener, with consequent limited separation of respective members, or of but limited slippage of the fastened members.

The salient features of these improvements are further clarified by reference to the various views as shown on the accompanying drawing.

Figure 4:
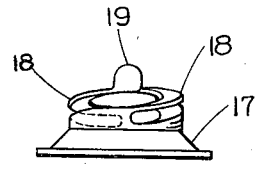

Figure 4, an end view as formed of sheet or bar material.

Figure 5:
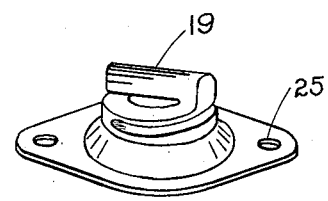

Figure 5 is a side elevation partly in plan as formed of sheet or bar material.

Figure 6:
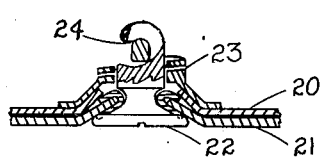

Figure 6 is a cross-sectional assembly view of sheet or bar fastener, together with attaching structural members and fastener stud.

The parts as illustrated in Figures 4, 5 and 6 could, of course, be also of cast material.

The round wire type of fastener 9 is formed from a length of wire into a compound helical coil having a bar 10 across the free end, portions of the coil having protuberances or irregularities 11 in coil convolutions and spring coil terminal ends as in loops 12.

In practice, the coil is riveted to a structural member 13 by rivets passing through member 13 and loops 12. A spirally bifurcated headed stud 14 projecting through a member 15 subject to attachment to the structural member 13 is utilized to engage spring coil bar 10 by a twisting motion into locked engagement.

Coil 9 is wound axially open between coils only sufficiently to provide for such locking engagement as hook portion 16 requires in passing over bar 10, compressing coil 9 virtually solid while so doing.

Suction or pressure forces tending to separate plates 13 and 15 may only do so to the limit of the clearances in the coil winding.

Tension forces between plates 13 and 15 impose shearing forces on the stud 14. Slippage of plates with respect to one another also tend to tip or cock the stud 14 sidewise.

Coincident with the slippage of the plates separation of these plates occurs until coil 9 assumes a solid height, the coil may then assume an off perpendicular position relative to its original position. In this event, the protuberances or overhanging irregularities 11 of sufficient length prevent any portion of a convolution of the spring coil to slip within another, thereby maintaining spring coil solid height.

The preferred type of fastener, as shown in Figures 4, 5 and 6, has marked advantages over fasteners made of wire. When made from solid material such as bars, plates or casts, etc., the base 17 can be made rigid. The double spring coil windings 18 can be made thin in an axial direction and relatively wide in a direction normal to the coil axis, providing relatively small axial resistance to compression when locking the stud into position, yet providing transverse rigidity.

The crossbar 19 may be made of a form having the best cross-sectional moment of inertia to withstand bending loads.

Figure 1:
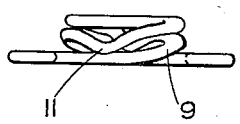
Figure 1 is an end view of double wound spring coil as made of round wire.
Figure 2:
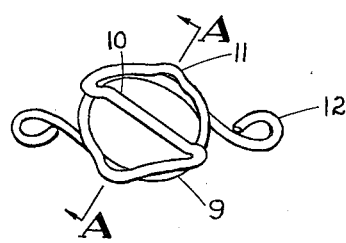
Figure 2 is a side elevation partly in plan of the round wire type.
Figure 3:
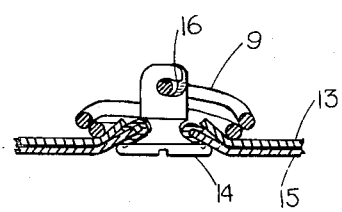
Figure 3 is a cross-sectional assembly view of the round wire fastener, members and fastener stud as taken in the direction of the arrows on line A—A of Figure 2.

In use, forces tending to separate plates 20 and 21 are counteracted by headed stud 22 in a manner similar to that of the stud in Figure 3.

As in the fastener of the round wire type, windings of coil 18 are manufactured with openings 23 only sufficient for stud hook 24 to engage bar 19 into locked engagement. Separation of plates 20 and 21 are limited therefore to this amount of spring coil winding clearance.

Forces causing separation and slippage of plates 20 and 21 with respect to one another tend to cock stud 22. The base 17 of the fastener is rigid of itself and fixedly attached to plate 20 usually by riveting through holes 25; the spring coil inner diameter slidably fits stud shank and has relative stiffness in a transverse direction.

The crossbar 19 integral or in fixed attachment to small end of spring coil also provides a measure of stiffness to the fastener.

In locked coengagement of stud, plates 20 and 21, and fastener, it is evident that the separation of plates 20 and 21 have been reduced to the amount of the fastener spring coil clearances as the coil assumes a solid height and that the slippage of the plates is limited to the cocking angle assumed by stud 22 which in turn is limited by the fastener inner diameter clearances and wall stiffness.

Having described the improvements in my invention,

I claim:

In a fastener, a compression spring coil of double windings joined at one end by an integral crossbar, the other end of said coil terminating at and integrally attached to a substantially annular top of a hollow truncated receptacle the bottom of which has means for attachment to a supporting structure, said windings of said coil of greater cross-sectional width transversely of coil axis than of thickness in an axial direction to provide relative inflexibility sidewise in comparison to the axial flexural resistance to load required to lock a cooperative fastener stud.

CAREL T. TORRESEN.

REFERENCES CITED

The following references are of record in the file of this patent:

UNITED STATES PATENTS

| Number | Name | Date |
| --- | --- | --- |
| 1,411,447 | Matt | Apr. 4, 1922 |
| 1,955,740 | Dzus | Apr. 24, 1934 |
| 2,228,760 | Funk | Jan. 14, 1941 |
| 2,301,477 | Taylor | Nov. 10, 1942 |
| 2,308,695 | Johnson | Jan. 19, 1943 |
| 2,339,591 | Weber | Jan. 18, 1944 |
| 2,347,675 | Dzus | May 2, 1944 |